Patented May 10, 1932

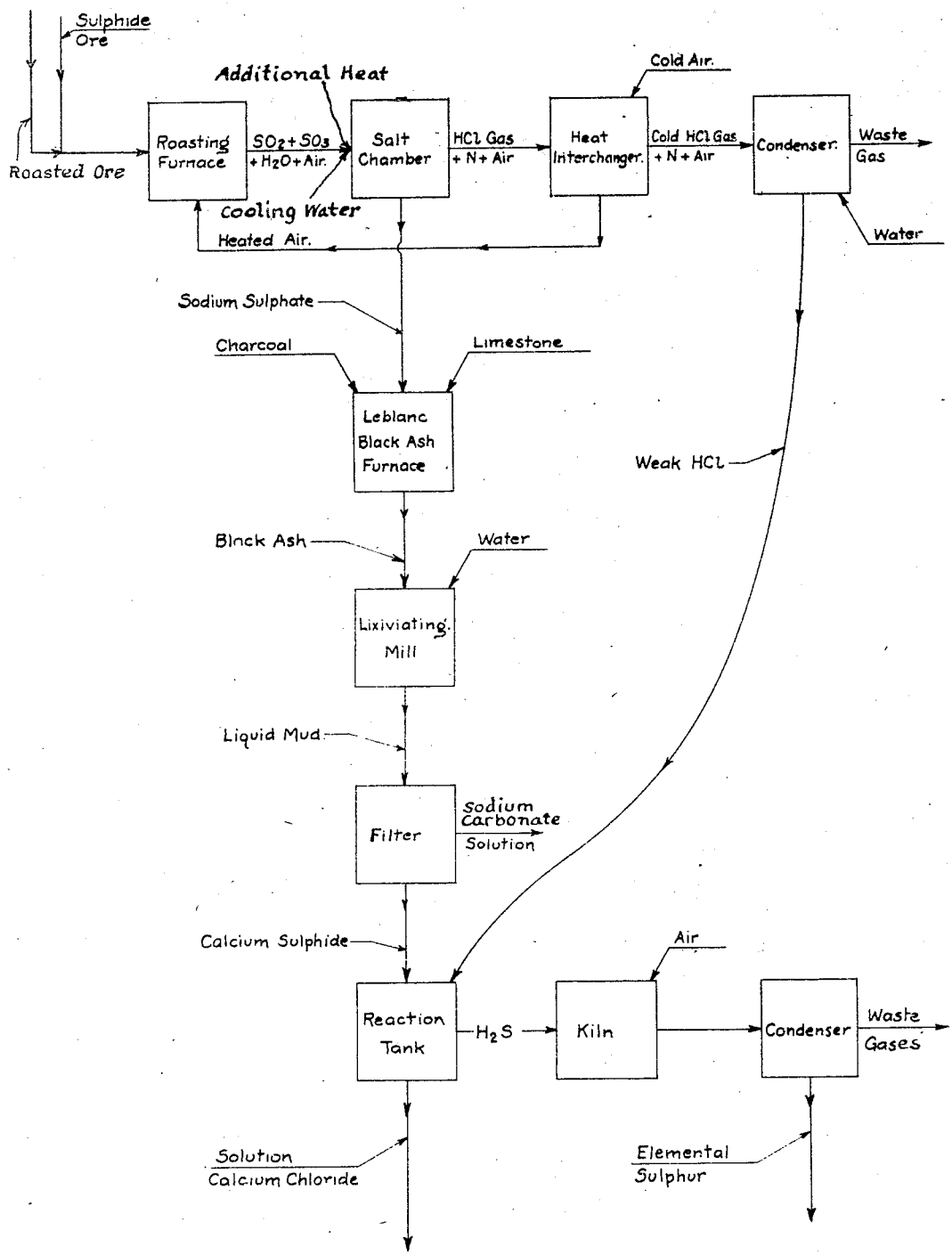

1,857,414

UNITED STATES PATENT OFFICE

ALFRED M. THOMSEN, OF SAN FRANCISCO, CALIFORNIA

METHOD FOR ECONOMIC RECOVERY OF SULPHUR FROM SMELTER SMOKE

Application filed April 18, 1927. Serial No. 184,597.

This invention relates to a method for the recovery of sulphur from the waste gases produced in the smelting of sulphide ores and particularly from the gases produced in the preliminary process of roasting.

The object of my invention is the actual recovery of the sulphur present in the original ore as the sulphide of various metals, in the form of elemental sulphur ready for the market. I achieve this object by means of a combination of various processes each of which is in itself well known, but having for its principal object another product than sulphur. Also by means of a series of improvements in these processes, in themselves new and novel whereby the operations referred to are facilitated. This combination is briefly enumerated as follows:

A diagrammatic flow sheet showing the various steps of the processes is illustrated in the accompanying drawing.

1. The sulphur fumes are first allowed to act on salt in the presence of air and steam whereby the sulphur becomes fixed as sodium sulphate, and hydro-chloric acid is evolved. The general dilute character of this acid when condensed is here no objection as it is later on used in the process. This is generally known as Hargreaves salt cake process.

2. The salt cake is mixed with carbon and calcium carbonate and fused. The melt is leached with water and filtered. The solution is a mixture of carbonate and hydroxide of sodium, the residue is chiefly calcium sulphide in which the sulphur remains fixed. The process is generally known as the Leblanc soda process.

3. The principal product of the first process is salt cake, hydro-chloric acid being the by-product. The principal product of the second step is caustic soda, the calcium sulphide being only a nuisance. I now combine these two by-products. The calcium sulphide is decomposed by the hydro-chloric acid yielding high strength hydrogen sulphide and a solution of calcium chloride. The sulphur originally present in the ore has become united with hydrogen as hydrogen sulphide.

4. The hydrogen sulphide is now mixed with insufficient air for complete combustion and passed through a bed of iron oxide where the hydrogen is burned and the sulphur liberated. This is well known as the last step of the Claus Chance process. The result is pure fused sulphur.

Now if I merely linked these historic processes together I would get the sulphur but at a prohibitive cost. The means whereby these steps become commercialized constitute my improvements. These are (A) my improvements in the first process, Hargreaves, consist in eliminating the costly and cumbersome cast iron cylinders, reverting to the original form of brick chambers. As these chambers can be neither heated nor cooled, I secure control by heating or cooling the stream of gases in its passage from one body of reacting salt to the next in line. The heating is accomplished by permitting a small current of highly heated gas to enter into and mix with the larger flow of reacting gases, for instance by permitting the products of combustion from a small fire of solid liquid or gaseous fuel to enter and mix with the main stream, or electric heating may be substituted. The cooling is effected by means of a water spray introduced into the gases, the latent heat absorbed being the means of cooling. By applying these means of heating and cooling wherever required, the process is greatly simplified as these may be rendered automatic.

(A-$b$) My second improvement in this process deals with the production of the sulphur fumes required. I find that these are very much improved if they are high in sulphur trioxide as well as in sulphur dioxide. I produce this increase by an improvement in the process of roasting. Raw ore is mixed with a large percentage of already roasted ore and returned to the furnace, e. g., there is virtually a cycle of roasted ore going into and returning to the furnace. Raw ore is fed into this and an equivalent quantity of calcines removed continuously. As such a mixture will not support its own combustion, the oxidizing air must be preheated. I secure this heat either from the roast gases themselves by means of a countercurrent heat interchanger or by the same means from hydro-chloric acid laden gases before they enter the condensing system.

In this manner the sulphur dioxide of the gas can be changed to trioxide up to nearly 50% of the total content. As the trioxide reacts very rapidly with salt the size of the plant required is very materially reduced. The combination of my improvements permits of very great economics in the first cost and also increased efficiency in the operation of the Hargreaves process.

(B) My improvements in the Leblanc process consist of using much less lime than is now customary and in substituting charcoal for coal as a reducing medium. "Balls" so produced cannot be lixiviated in Shank's vats, the present system, but they are easily dissolved by submitting them to the action of cold water in a tube mill, and filtering the resultant cold thin mud by means of a modern pressure or vacuum filter. Very strong, pure caustic is easily made from liquor so obtained, and the operation being entirely mechanical and not dependent upon skill obviates most of the difficulties in this time honored process.

(C) Similarly, as the calcium sulphide is discharged continuously in a steady stream of thin mud, it is in ideal condition for reacting with hydro-chloric acid which, as already mention, may be as weak as desired. Strong hydrogen sulphide is produced and unlike the gas utilized in the Claus Chance process, it contains no inert nitrogen. For this reason it reacts far better in the kiln though this is due entirely to the greater concentration of hydrogen sulphide.

Having thus described my invention, what I claim and desire to secure by Letters Patent is:—

1. In a method for the economic recovery of sulphur from smelter smoke resulting from an ore roasting process by increasing the sulphur trioxide and sulphur dioxide content of the gases liberated, the steps which consist of diluting the charge of raw ore with ore already roasted, and of admitting to the roasting furnace preheated air.

2. In a method for the economic recovery of sulphur from smelter smoke, resulting from an ore roasting process by increasing the sulphur trioxide and sulphur dioxide content of the gases liberated, the steps which consist of diluting the charge of raw ore with ore already roasted, admitting an oxidizing air, passing the roast gases containing sulphur trioxide and sulphur dioxide through a chamber containing salt, and preheating the oxidizing air for the roasting furnace by passing the air through a heat exchanger which is heated by hydrochloric acid gases produced by the reaction of the sulphur trioxide and sulphur dioxide gases on the salt.

3. A method of obtaining elemental sulphur from sulphide ores which consists in dilution of the ore during the roasting operation by ore already roasted admitting a preheated oxidizing air, passing the gas liberated which contains a large proportion of sulphur trioxide and sulphur dioxide through a body of salt to obtain sodium sulphate and hydro-chloric acid gas, absorbing the gas, fusing the sodium sulphate with lime and charcoal, lixiviating the fused product in cold water in a tube mill, filtering the resultant cold thin mud to obtain a sodium carbonate solution and calcium sulphide, passing the absorbed hydro-chloric acid into the calcium sulphide to obtain a strong hydrogen sulphide gas, mixing the hydrogen sulphide with insufficient air for complete combustion, passing the mixed gas through a bed of iron oxide to consume the hydrogen and then condensing the sulphur.

ALFRED M. THOMSEN.